United States Patent
Saito et al.

(10) Patent No.: US 11,919,458 B2
(45) Date of Patent: Mar. 5, 2024

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/990,104

(22) Filed: Nov. 18, 2022

(65) Prior Publication Data

US 2023/0166673 A1  Jun. 1, 2023

(30) Foreign Application Priority Data

Nov. 26, 2021 (JP) ................. 2021-192258

(51) Int. Cl.
*B60R 16/02* (2006.01)
*H02G 3/04* (2006.01)
*H02G 3/32* (2006.01)

(52) U.S. Cl.
CPC ....... *B60R 16/0215* (2013.01); *H02G 3/0462* (2013.01); *H02G 3/32* (2013.01)

(58) Field of Classification Search
CPC .. H02G 3/04; H02G 3/30; H02G 3/32; H02G 3/40; H02G 3/0418; H02G 3/0462; H02G 3/0481; B60R 16/0207; B60R 16/0215; H01B 7/0045
USPC ................ 248/68.1, 73, 74.1–74.4
See application file for complete search history.

(56) References Cited

U.S. PATENT DOCUMENTS

| | | | | | |
|---|---|---|---|---|---|
| 4,786,119 | A | * | 11/1988 | Smuda | F16B 12/34 248/221.12 |
| 5,560,397 | A | * | 10/1996 | Miller | H02G 3/22 138/110 |
| 8,870,131 | B2 | * | 10/2014 | Gotou | F16B 21/086 248/65 |
| 2003/0213876 | A1 | * | 11/2003 | Takeuchi | H02G 3/32 248/74.1 |
| 2005/0284989 | A1 | * | 12/2005 | Mizukoshi | F16L 55/035 248/65 |
| 2011/0049312 | A1 | * | 3/2011 | Kato | F16L 55/035 248/74.1 |
| 2018/0199676 | A1 | * | 7/2018 | Kempf | A44B 17/0011 |

FOREIGN PATENT DOCUMENTS

| | | | | |
|---|---|---|---|---|
| JP | 2006-046508 A | | 2/2006 | |
| JP | 2009038899 A | * | 2/2009 | ........... F16B 2/08 |
| KR | 20170128643 A | * | 11/2017 | ........... B60R 16/02 |

* cited by examiner

*Primary Examiner* — Paresh Paghadal
(74) *Attorney, Agent, or Firm* — Oliff PLC (57) ABSTRACT

A wire harness including: an electrical wire; and a fixing member that fixes the electrical wire to an attachment target, wherein: the fixing member has: a bolt fixing portion to be fixed to a bolt of the attachment target; and a holder that holds the electrical wire, the bolt fixing portion includes: a side surface that opposes the attachment target; a bolt insertion opening provided in the side surface and into which the bolt is to be inserted; an engagement that engages, in an axial direction, the bolt inserted into the bolt fixing portion through the bolt insertion opening; and a biasing part that is provided on the side surface and comes into contact with the attachment target.

5 Claims, 5 Drawing Sheets

WIRE HARNESS

BACKGROUND

The present disclosure relates to a wire harness.

A wire harness of JP 2006-46508A, for example, includes a fixing member that fixes a wire member to a vehicle body. The fixing member has a holding portion that holds the wire member and a bolt fixing portion that is fixed to a bolt provided on the vehicle body. The bolt fixing portion has an engaging piece that engages a threaded portion of the bolt in the axial direction. At least a pair of engaging pieces are provided so as to sandwich the bolt in a direction orthogonal to the axial direction. When assembling the fixing member to the bolt, the bolt is inserted into the fixing member. At this time, the engaging pieces flex in a direction away from each other due to being pushed by the bolt. The engaging pieces are then biased toward the bolt by their elasticity and engage the threaded portion of the bolt.

Also, the bolt fixing portion has a biasing part that elastically contacts a panel of the vehicle body and applies a biasing force to the panel. In the fixing member of JP 2006-46508A, a spring piece is provided as the biasing part in the vicinity of a bolt insertion opening. The spring piece is provided as a pair on each side of the bolt as seen from a direction orthogonal to the axial direction of the bolt. The pair of spring pieces extend from a side surface of the bolt fixing portion that opposes the panel so as to move away from each other. The distal end of each spring piece is a free end that is located away from the side surface of the bolt fixing portion. Due to the biasing force that is applied to the panel by each spring piece, it becomes possible to suppress rattling of the fixing member.

SUMMARY

With a configuration such as described above, the distal end portions of the spring pieces could get caught on something, when the fixing member is being shipped or when assembling a wire harness that includes the fixing member to a vehicle, giving rise to the possibility that the spring pieces will be deformed or broken.

An exemplary aspect of the disclosure provides a wire harness designed to inhibit damage to a biasing part.

A wire harness of the present disclosure is a wire harness including an electrical wire; and a fixing member that fixes the electrical wire to an attachment target, wherein: the fixing member has: a bolt fixing portion to be fixed to a bolt of the attachment target; and a holder that holds the electrical wire, the bolt fixing portion includes: a side surface that opposes the attachment target; a bolt insertion opening provided in the side surface and into which the bolt is to be inserted; an engagement that engages, in an axial direction, the bolt inserted into the bolt fixing portion through the bolt insertion opening; and a biasing part that is provided on the side surface and comes into contact with the attachment target, the biasing part has a pair of elastic pieces extending from the side surface, and the pair of elastic pieces incline so as to approach each other proceeding away from the side surface, with distal ends of the pair of elastic pieces facing each other.

Also, a wire harness of the present disclosure is a wire harness including an electrical wire; and a fixing member that fixes the electrical wire to an attachment target, wherein: the fixing member has: a bolt fixing portion to be fixed to a bolt of the attachment target; and a holder that holds the electrical wire, the bolt fixing portion includes: a side surface that opposes the attachment target; a bolt insertion opening provided in the side surface and into which the bolt is to be inserted; an engagement that engages, in an axial direction, the bolt inserted into the bolt fixing portion through the bolt insertion opening; and a biasing part that is provided on the side surface and comes into contact with the attachment target, and the biasing part has: a first connection end joined to the side surface; a second connection end joined to the side surface; and an elastic portion that connects the first connection end and the second connection end, and that comes into contact with the attachment target and applies a force to the attachment target.

According to a wire harness of the present disclosure, it becomes possible to inhibit damage to a biasing part.

DETAILED DESCRIPTION OF EMBODIMENTS

Description of Embodiments of the Disclosure

Initially, embodiments of the disclosure will be enumerated and described.

A wire harness of the present disclosure is:

[1] A wire harness including a wire member having an electrical wire, and a fixing member that fixes the wire member to an attachment target, the fixing member having a bolt fixing portion to be fixed to a bolt of the attachment target, and a holding portion that holds the wire member, the bolt fixing portion including a side surface that opposes the attachment target, a bolt insertion opening provided in the side surface and into which the bolt is to be inserted, an engaging part that engages, in an axial direction, the bolt inserted into the bolt fixing portion through the bolt insertion opening, and a biasing part that is provided on the side surface and comes into contact with the attachment target, the biasing part having a pair of elastic pieces extending from the side surface, and the pair of elastic pieces inclining so as to approach each other proceeding away from the side surface, with distal ends of the pair of elastic pieces facing each other.

According to this configuration, the distal ends of the pair of elastic pieces of the biasing part face each other. Thus, when the fixing member is being shipped or when assembling a wire harness that includes the fixing member to a vehicle, for example, catching of the distal ends of the elastic pieces is inhibited. It thereby becomes possible to inhibit damage to the elastic pieces of the biasing part.

[2] The biasing part may have a connecting part connecting the distal ends of the pair of elastic pieces to each other.

According to this configuration, due to the distal ends of the pair of elastic pieces being connected to each other by the connecting part, it becomes possible to improve the rigidity of the elastic pieces. Also, due to the distal ends of the pair of elastic pieces being connected to each other by the connecting part, it becomes possible to inhibit catching of the distal ends of the elastic pieces. Accordingly, it becomes possible to further inhibit damage to the elastic pieces.

[3] The connecting part may be thinner in thickness than the elastic pieces.

According to this configuration, it becomes possible to constitute the connecting part connecting the distal ends of the elastic pieces to each other while at the same time ensuring the ease of flexing of the elastic pieces.

[4] A wire harness of the present disclosure is a wire harness including a wire member having an electrical wire, and a fixing member that fixes the wire member to an attachment target, the fixing member having a bolt fixing portion to be fixed to a bolt of the attachment target, and a holding portion that holds the wire member, the bolt fixing portion including a side surface that opposes the attachment target, a bolt insertion opening provided in the side surface and into which the bolt is to be inserted, an engaging part that engages, in an axial direction, the bolt inserted into the bolt fixing portion through the bolt insertion opening, and a biasing part that is provided on the side surface and comes into contact with the attachment target, and the biasing part having a first connection end joined to the side surface, a second connection end joined to the side surface, and an elastic portion that connects the first connection end and the second connection end, and that comes into contact with the attachment target and applies a force to the attachment target.

According to this configuration, the biasing part is constituted to not have a free end that is not joined to the side surface of the bolt fixing portion. Thus, when the fixing member is being shipped or when assembling a wire harness that includes the fixing member to the vehicle, for example, catching of the biasing parts is inhibited. It thereby becomes possible to inhibit damage to the biasing part.

[5] The elastic portion may have a circular arc shape that is convex on a side on which the biasing part protrudes from the side surface.

According to this configuration, it becomes possible to suitably apply a force to the attachment target with the elastic portion.

[6] The wire harness may include an exterior member covering an outer periphery of the wire member, and a path regulating member attached to an outer periphery of the exterior member and regulating a path of the exterior member, and the path regulating member may have an insertion opening open in a direction orthogonal to a length direction of the path regulating member and extending over an entirety of the path regulating member in the length direction. According to this configuration, it becomes possible to inhibit damage to the biasing part of the bolt fixing portion, in a wire harness having the path regulating member.

[7] The holding portion may hold the path regulating member in a manner covering an entire circumference of the path regulating member, the holding portion may have a protrusion protruding on an inner peripheral side, and the protrusion may be positioned inside the insertion opening of the path regulating member. According to this configuration, rotation of the path regulating member relative to the holding portion can be regulated by the protrusion of the holding portion.

Detailed Description of Embodiments of the Disclosure

Specific examples of a wire harness of the present disclosure will be described below with reference to the drawings. In the individual diagrams, parts of the configuration may be shown in an exaggerated or simplified manner, for convenience of description. Also, the dimensional ratios of various portions may differ between the individual diagrams. Also, "orthogonal" herein is not only strictly orthogonal but also includes generally orthogonal within a range that achieves the operation and effect of the present embodiment.

Note that "opposing" herein refers to two surfaces or members being positioned in front of each other, and includes not only the case where the two portions are perfectly in front of each other but also the case where the two portions are partially in front of each other. Also, "opposing" herein includes both the case where another member other than the two portions is interposed between the two portions and the case where another member is not interposed between the two portions.

Overall Configuration of Wire Harness 10

Figure 1:
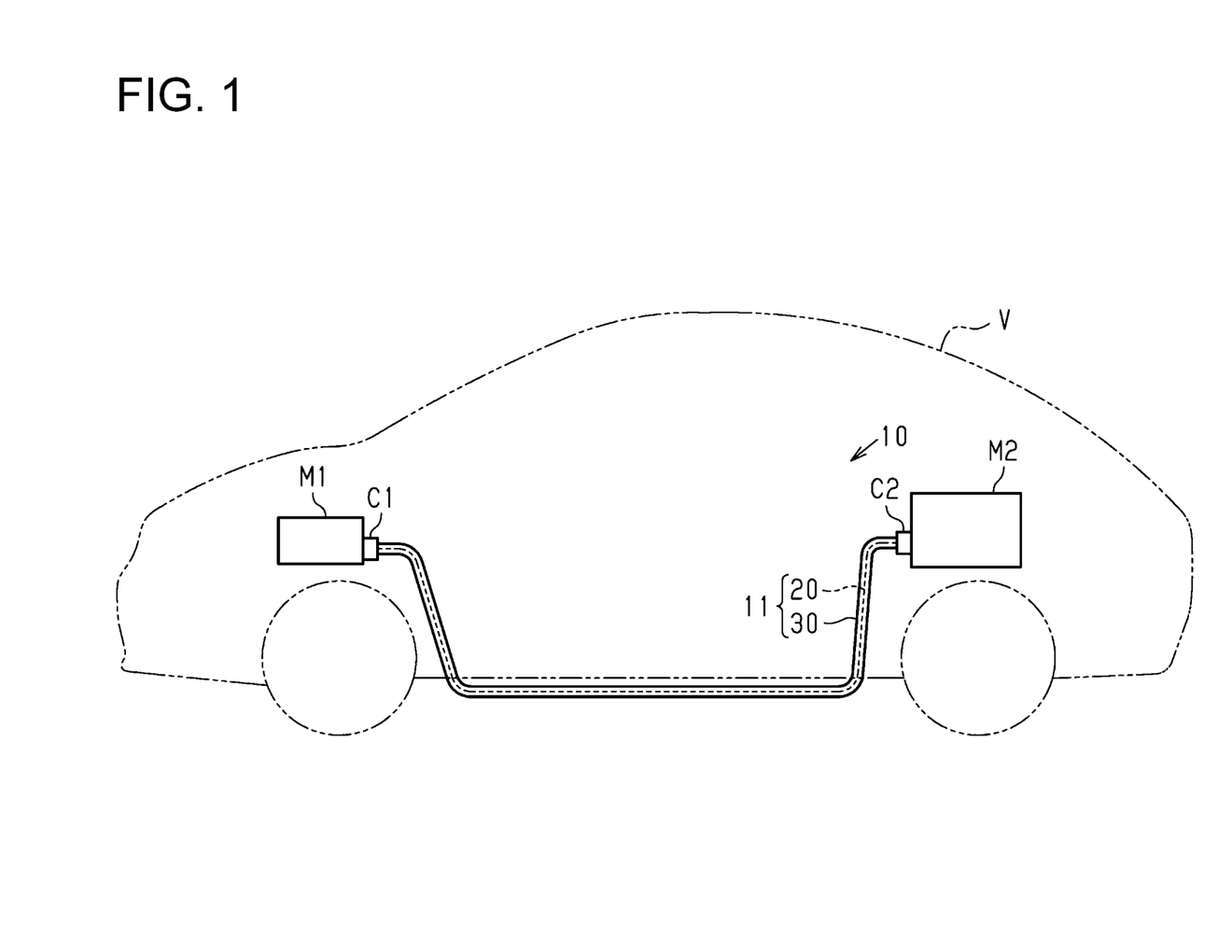
FIG. 1 is a schematic configuration diagram showing a wire harness of an embodiment.

A wire harness 10 shown in FIG. 1 is installed in a vehicle V such as a hybrid vehicle or an electric vehicle, for example. The wire harness 10 electrically connects two or more in-vehicle devices to each other. The in-vehicle devices are electrical devices installed in the vehicle V. The wire harness 10 electrically connects an inverter M1 installed in a front part of the vehicle V to a high voltage battery M2 installed more rearwardly in the vehicle V than the inverter M1. The wire harness 10 is formed in a long shape so as to extend in the front-rear direction of the vehicle V, for example. The wire harness 10 is routed in the vehicle V such that an intermediate portion of the wire harness 10 in the length direction passes outside the vehicle cabin such as under the floor of the vehicle V, for example.

The inverter M1 is, for example, connected to a motor for driving wheels not shown that serves a power source for vehicle travel. The inverter M1 generates AC power from DC power of the high voltage battery M2 and supplies the generated AC power to the motor. The high voltage battery M2 is, for example, a battery capable of supplying a voltage of several hundred volts.

The wire harness 10 has a wire harness body 11. The wire harness body 11 includes a wire member 20 and a tubular exterior member 30 (exterior tube) that covers the outer periphery of the wire member 20. The wire harness 10 has connectors C1 and C2 attached to either end portion of the wire member 20. One end portion of the wire member 20 in the length direction is connected to the inverter M1 via the connector C1, and the other end portion of the wire member 20 in the length direction is connected to the high voltage battery M2 via the connector C2.

Configuration of Wire Member 20

Figure 2:
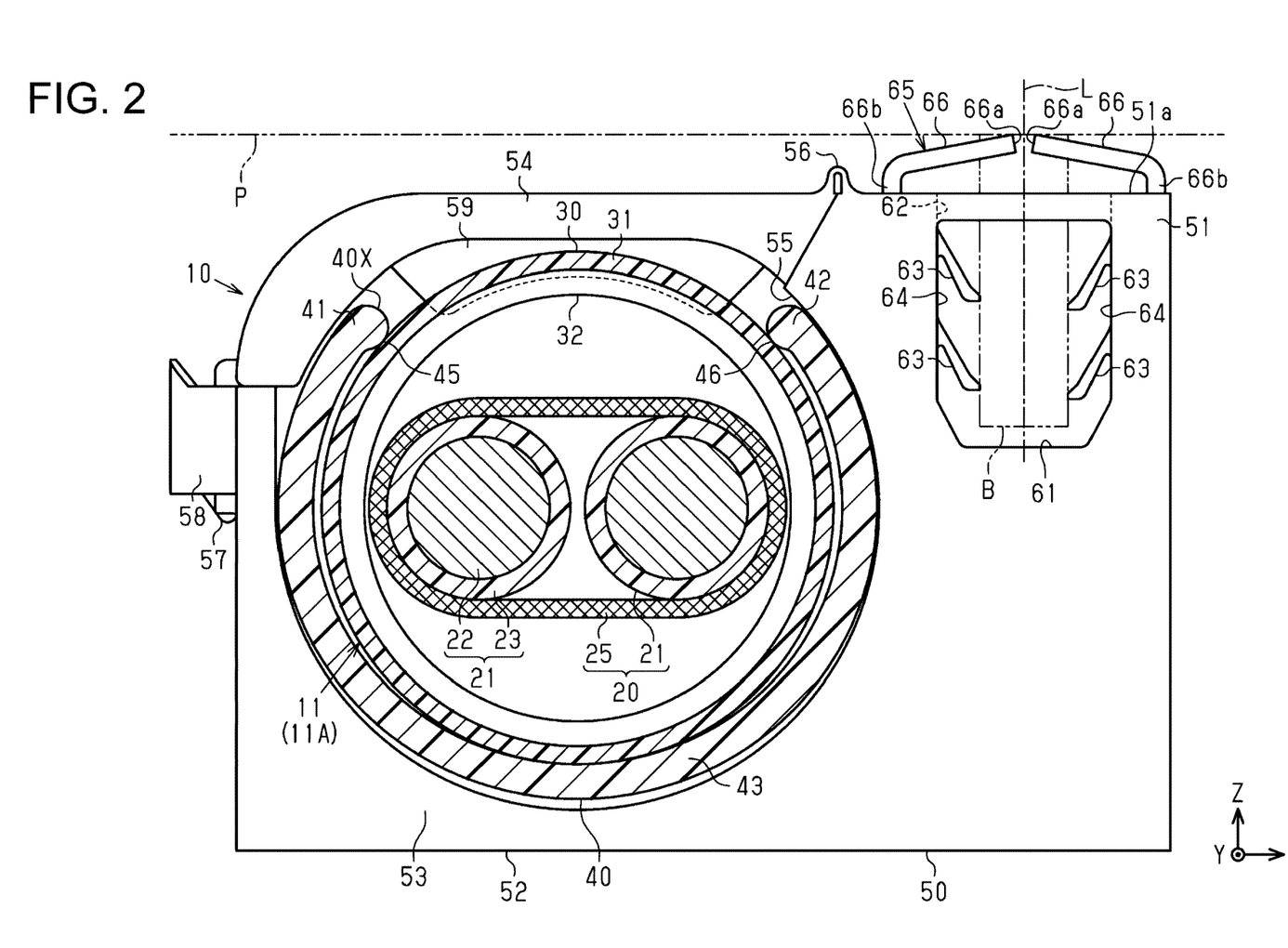
FIG. 2 is a schematic cross-sectional view showing the wire harness of the embodiment.
Figure 3:
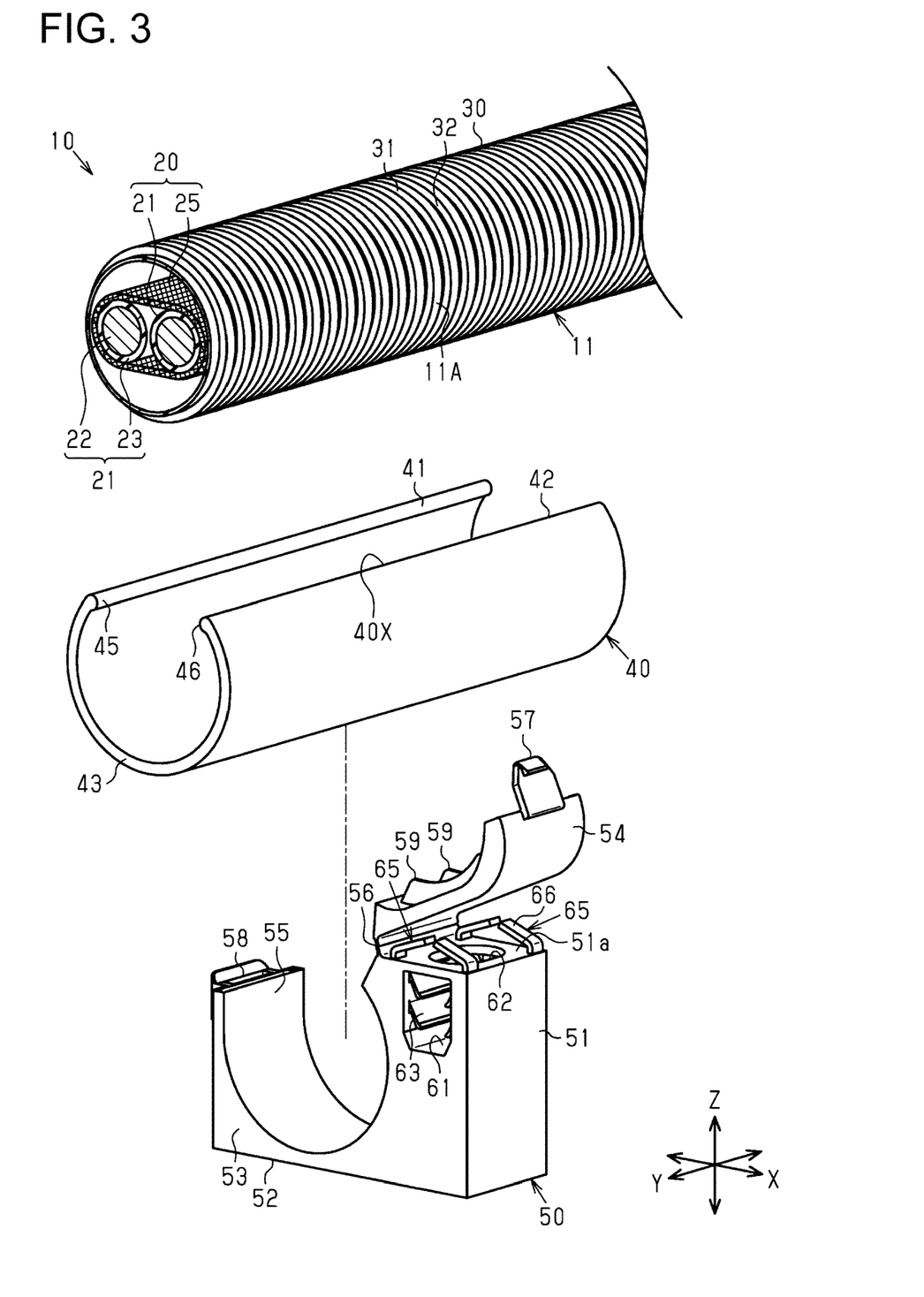
FIG. 3 is a schematic exploded perspective view showing the wire harness of the embodiment.

As shown in FIGS. 2 and 3, the wire member 20 has, for example, one or a plurality of electrical wires, being two electrical wires 21 in the present embodiment, and a braided member 25 that collectively encloses the outer periphery of the plurality of wires 21.

As shown in FIG. 2, the wires 21 are coated wires having a core wire 22 that has conductivity and an insulation coating 23 that has insulating properties and surrounds the outer periphery of the core wire 22. The wires 21 are, for example, high voltage wires capable of handling high voltages and large currents. The wires 21 may, for example, be unshielded wires that do not have their own electromagnetic shield structure, or be shielded wires that have their own electromagnetic shield structure. The wires 21 of the present embodiment are unshielded wires.

As the core wire 22, a twisted wire formed by twisting together a plurality of metal wire strands or a single core wire formed from a single conductor can be used, for example. As the single core wire, a columnar conductor formed from a single columnar metal rod having a solid structure internally or a tubular conductor having a hollow structure internally can be used, for example. As the core wire 22, a twisted wire, a columnar conductor and a tubular conductor may also be used in combination. As the material of the core wire 22, a metal material such as a copper-based or aluminum-based material can be used, for example.

The insulation coating 23 covers the entire circumference of the outer peripheral surface of the core wire 22 in the circumferential direction, for example. The insulation coating 23 is constituted by a resin material having insulating properties, for example.

The cross-sectional shape obtained by cutting the wires 21 by a plane orthogonal to the length direction of the wires 21, that is, the transverse sectional shape of the wires 21, can be formed in any shape. The transverse sectional shape of the wires 21 is formed in a circular shape, a semi-circular shape, a polygonal shape, a square shape or a flat shape, for example. The transverse sectional shape of the wires 21 of the present embodiment is formed in a circular shape.

The braided member 25 has a tubular shape that collectively encloses the outer periphery of the plurality of wires 21 as a whole, for example. As the braided member 25, a braided wire in which a plurality of metal wire strands are braided or a braided wire in which metal and resin wire strands are braided together can be used, for example. As the material of the metal wire strands, a metal material such as a copper-based or aluminum-based material can be used, for example. Although not illustrated, both end portions of the braided member 25 in the length direction are grounded at the connectors C1 and C2 (see FIG. 1), for example.

Configuration of Exterior Member 30

As shown in FIG. 3, the exterior member 30 has a tubular shape that encloses the entire circumference of the outer periphery of the wire member 20 in the circumferential direction. The exterior member 30 of the present embodiment is formed in a cylindrical shape. The exterior member 30 is formed as a peripheral wall to continuously span the entire circumference of the exterior member 30 in the circumferential direction, for example. The exterior member 30 seals the inside of the exterior member 30 around the entire circumference in the circumferential direction, for example. The exterior member 30 has a function of protecting the wire member 20 from projectiles and water droplets, for example.

The exterior member 30 has flexibility and is easily bendable, for example. Examples of the flexible exterior member 30 include a corrugated tube made of resin and a waterproof cover made of rubber, for example. The exterior member 30 of the present embodiment is a resin corrugated tube having a bellows shape constituted by alternating large and small diameter portions in the length direction of the exterior member 30. That is, the exterior member 30 of the present embodiment has a bellows structure in which a large diameter portion 31 and a small diameter portion 32 having a diameter smaller than the large diameter portion 31 are alternately provided continuously in the length direction of the exterior member 30. The large diameter portions 31 and the small diameter portions 32 each have an annular shape completely around the exterior member 30 in the circumferential direction, for example. As the material of the exterior member 30, a synthetic resin such as polyolefin, polyamide, polyester or ABS resin can be used, for example.

Configuration of Path Regulating Member 40

As shown in FIGS. 2 and 3, the wire harness 10 includes a path regulating member 40 that is attached to the outer periphery of the exterior member 30. The path regulating member 40 regulates the path along which the wire harness body 11 is routed. Note that, in FIG. 1, the path regulating member 40 is not illustrated.

The path regulating member 40 holds the exterior member 30. The path regulating member 40 is, for example, more rigid than the exterior member 30. The path regulating member 40 has a stiffness that is not readily bendable in a direction orthogonal to the length direction of the wire harness body 11, compared to the exterior member 30. The path regulating member 40 thereby regulates the path of the wire harness body 11. For example, the path regulating member 40 supports the exterior member 30, such that the wire harness body 11 does not flex under its own weight and deviate from the desired path. The path regulating member 40 is provided along part of the wire harness body 11 in the length direction. The path regulating member 40 is, for example, attached to the outer periphery of the exterior member 30 in a straight section 11A which is a section of the path of the wire harness body 11 that has a straight shape.

As shown in FIG. 2, the path regulating member 40 covers part of the outer periphery of the exterior member 30 in the circumferential direction of the exterior member 30. The path regulating member 40 has a shape that partially covers the outer periphery of the exterior member 30 in the circumferential direction of the exterior member 30. The transverse sectional shape of the path regulating member 40 is C-shaped as a whole. The path regulating member 40 covers more than half of the outer periphery of the exterior member 30, for example. That is, the path regulating member 40 covers more than half of the entire circumference of the outer periphery of the exterior member 30 in the circumferential direction of the exterior member 30.

The path regulating member 40 extends in the length direction of the exterior member 30 in the straight section 11A. The path regulating member 40 is formed in a shape that extends straight in one direction, for example. The transverse sectional shape of the path regulating member 40 is uniform over the entire length of the path regulating member 40 in the length direction, for example.

The path regulating member 40 is made of metal or resin, for example. The path regulating member 40 of the present embodiment is made of resin. As the material of the path regulating member 40, a synthetic resin such as polypropylene, polyamide or polyacetal can be used, for example. The path regulating member 40 can be manufactured by a known manufacturing method such as extrusion molding or injection molding, for example. In the present embodiment, the path regulating member 40 is an extrusion molded product manufactured by extrusion molding. Therefore, the path regulating member 40 can be easily manufactured, by using an extrusion molding machine that extrudes the raw material of the path regulating member 40 in the length direction. Also, a plurality of types of path regulating members 40 having different dimensions in the length direction can be manufactured using a single extrusion molding machine. For example, a plurality of types of path regulating members 40 having different dimensions in the length direction can be manufactured, by cutting the base material of the path regulating member 40 formed with a single extrusion molding machine at suitable lengths using a cutting machine.

The path regulating member 40 has an insertion opening 40X that is open in a direction orthogonal to the length direction of the path regulating member 40. The insertion opening 40X extends over the entirety of the path regulating member 40 in the length direction. The path regulating member 40 has a first end portion 41 and a second end portion 42 that are respective end portions of the path regulating member 40 in the circumferential direction and form the insertion opening 40X. The path regulating member 40 has a connecting portion 43 that connects the first end portion 41 and the second end portion 42 to each other. In other words, the path regulating member 40 has the connecting portion 43 formed so as to partially cover the exterior member 30 in the circumferential direction, the first end portion 41 and the second end portion 42 provided at respective end portions of the connecting portion 43, and the insertion opening 40X formed by the first end portion 41 and the second end portion 42.

The connecting portion 43 constitutes a main portion of the path regulating member 40. The thickness of the connecting portion 43 in the radial direction is, for example, uniform in the circumferential direction of the path regulating member 40. The transverse sectional shape of the connecting portion 43 is formed in a shape that follows the outer surface of the exterior member 30, for example. The transverse sectional shape of the first end portion 41, the second end portion 42 and the connecting portion 43 is formed in a circular arc shape, for example.

The first end portion 41 and the second end portion 42 are provided on opposite sides to each other in the circumferential direction of the path regulating member 40. The first end portion 41 and the second end portion 42 are provided apart from each other in the circumferential direction of the path regulating member 40 across the insertion opening 40X. In other words, the gap between the first end portion 41 and the second end portion 42 in the circumferential direction of the path regulating member 40 is constituted as the insertion opening 40X. In this way, the path regulating member 40 is formed in a C-shape having the insertion opening 40X in part of the path regulating member 40 in the circumferential direction.

The transverse sectional shape of the distal ends of the first end portion 41 and the second end portion 42 is formed in a curved shape. The transverse sectional shape of the distal ends of the first end portion 41 and the second end portion 42 of the present embodiment is formed in a circular arc shape.

The path regulating member 40 has a protruding portion 45 that protrudes from the inner surface of the first end portion 41 and a protruding portion 46 that protrudes from the inner surface of the second end portion 42. The protruding portions 45 and 46 protrude toward the exterior member 30 inserted inside the path regulating member 40 and contact the outer surface of the exterior member 30. The protruding portions 45 and 46 contact the outer surface of the large diameter portions 31 of the exterior member 30. The protruding portion 45 protrudes from the inner surface of the distal end of the first end portion 41, for example. The protruding portion 46 protrudes from the inner surface of the distal end of the second end portion 42, for example. The transverse sectional shape of the protruding portions 45 and 46 is formed in a curved shape, for example. The transverse sectional shape of the protruding portions 45 and 46 of the present embodiment is formed in a circular arc shape.

As shown in FIG. 3, the protruding portions 45 and 46 extend in the length direction of the path regulating member 40. The protruding portions 45 and 46 extend over the entire length of the path regulating member 40 in the length direction, for example.

The protruding portions 45 and 46 press against the exterior member 30 from the outer side of the exterior member 30. The exterior member 30 is elastically sandwiched by the protruding portion 45, the protruding portion 46 and the connecting portion 43. The path regulating member 40 is thereby firmly connected to the exterior member 30.

As shown in FIG. 2, the opening width of the insertion opening 40X, that is, the shortest distance between the first end portion 41 and the second end portion 42, is smaller than the outer diameter of the exterior member 30.

The opening width of the insertion opening 40X increases due to the path regulating member 40 elastically deforming. For example, the opening width of the insertion opening 40X increases, due to the exterior member 30 being inserted into the insertion opening 40X from a direction orthogonal to the length direction of the path regulating member 40. When the exterior member 30 is inserted inside the path regulating member 40, the path regulating member 40 elasticity returns toward its original shape. Since the opening width of the insertion opening 40X is smaller than the outer diameter of the exterior member 30, the path regulating member 40 is thereby attached to the outer periphery of the exterior member 30.

Configuration of Fixing Member 50

As shown in FIG. 2, the wire harness 10 includes a fixing member 50 for fixing the wire harness body 11 to a panel P constituting a floor part of the vehicle V. One or a plurality of fixing members 50 are provided in the length direction of the wire harness body 11. Note that the fixing member 50 is not illustrated in FIG. 1. The fixing member 50 holds a region of the wire harness body 11 to which the path regulating member 40 is attached, for example.

The fixing member 50 is made of metal or resin, for example. The fixing member 50 of the present embodiment is made of resin. As the material of the fixing member 50, a synthetic resin such as polypropylene, polyamide or polyacetal can be used, for example. The fixing member 50 can be manufactured by a known manufacturing method such as injection molding, for example.

As shown in FIGS. 2 and 3, the fixing member 50 has a bolt fixing portion 51 that is fixed to a bolt B extending from the panel P, and a holding portion 52 (holder) that holds the wire harness body 11.

Configuration of Holding Portion 52

The holding portion 52 holds the path regulating member 40 in a manner covering the entire circumference of the path regulating member 40. The holding portion 52 includes a holding portion body 53 and a lid part 54 connected to the holding portion body 53.

The holding portion body 53 covers the outer periphery of the connecting portion 43 of the path regulating member 40, for example. The holding portion body 53 has an insertion opening 55 that is covered by the lid part 54. The insertion opening 55 is open in a direction orthogonal to the length direction of the wire harness body 11. Note that the transverse sectional shape of the inner surface of the lid part 54 is formed in a shape that follows the outer surface of the exterior member 30, for example.

The lid part 54 is integrally formed with the holding portion body 53, for example. The lid part 54 is joined to the holding portion body 53 by a hinge part 56, for example. The lid part 54 is rotatable between an open position and a closed position covering the insertion opening 55, with the hinge part 56 as the axis. Note that the lid part 54 shown in FIG. 2 is in the closed position, and the lid part 54 shown in FIG. 3 is in the open position.

Also, the lid part 54 has an engaging claw 57. The engaging claw 57 is engaged with a locking part 58 provided on the holding portion body 53, in a state where the lid part 54 is in the closed position. The lid part 54 is thereby held in the closed position. Note that the wire harness body 11 is held in the holding portion 52 with the insertion opening 40X oriented to face the lid part 54 side.

As shown in FIGS. 2 and 3, the holding portion 52 has a protrusion 59 that protrudes on the inner peripheral side, that is, the wire harness body 11 side. The protrusion 59 is formed in the holding portion 52 so as to protrude from the inner surface of the lid part 54, for example. One or a plurality of protrusions 59 are provided.

In a state where the lid part 54 is in the closed position, the protrusion 59 is positioned inside the insertion opening 40X of the path regulating member 40. Rotation of the path regulating member 40 relative to the holding portion 52 can thereby be regulated by the protrusion 59. Also, the protrusion 59 fits in the small diameter portion 32 of the exterior member 30. Movement of the exterior member 30 relative to the holding portion 52 is thereby inhibited in the length direction of the exterior member 30.

Configuration of Bolt Fixing Portion 51

The bolt fixing portion 51 is integrally formed with the holding portion body 53. The bolt fixing portion 51 has an insertion hole 61 through which the bolt B is inserted. Note that, in FIGS. 2, 3 and 4, a width direction X, a depth direction Y and a height direction Z are illustrated as three directions of the fixing member 50 that are orthogonal to each other. The bolt B is inserted into the insertion hole 61 in the height direction Z. Also, the wire harness body 11 is disposed in the holding portion 52 such that the length direction thereof is in the depth direction Y.

Figure 4:
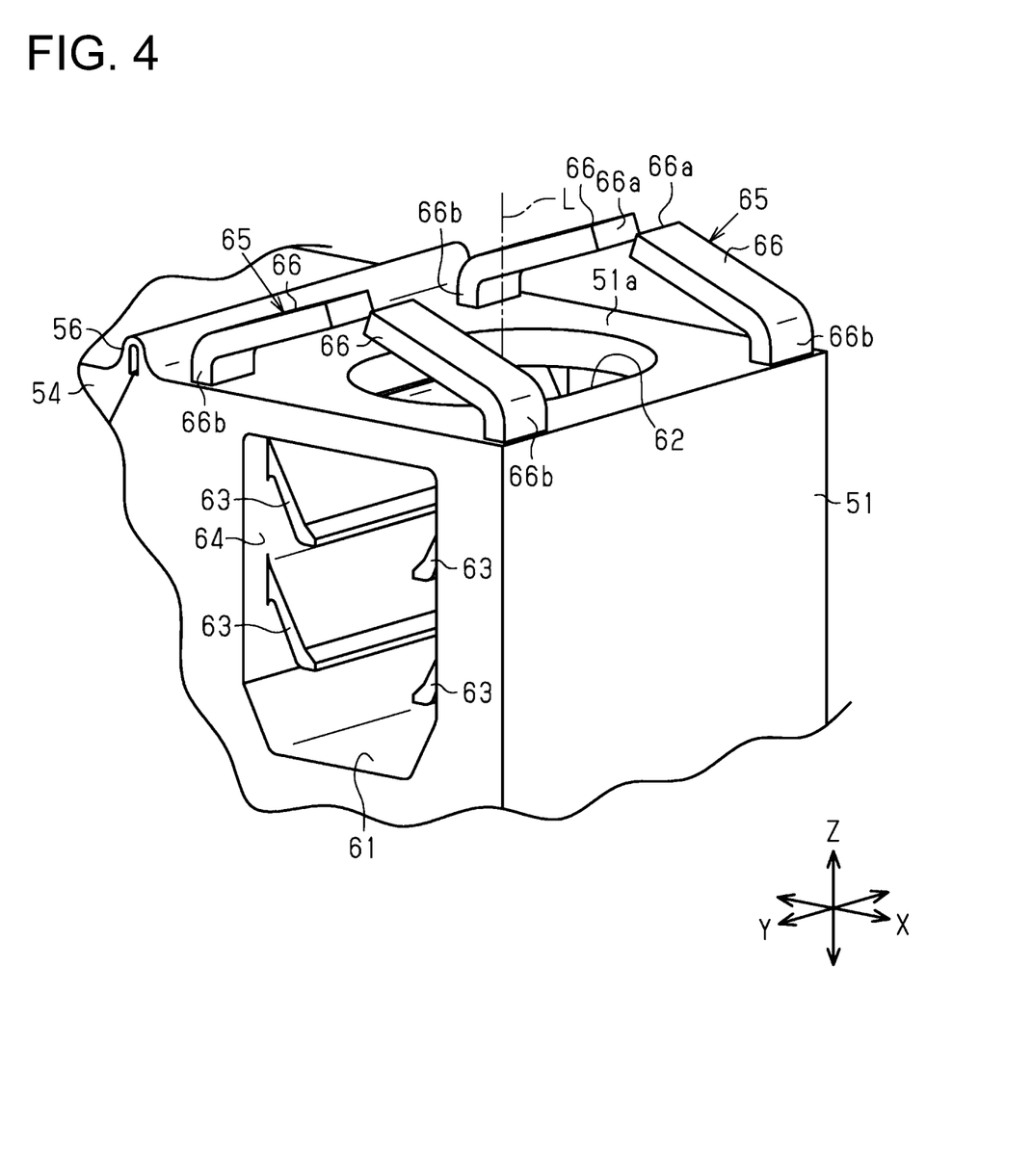
FIG. 4 is a schematic perspective view showing the configuration in the vicinity of a bolt fixing portion in an enlarged manner in the wire harness of the embodiment.

As shown in FIGS. 2 and 4, the bolt fixing portion 51 has a side surface 51a that opposes the panel P in a state where the wire harness 10 is attached to the vehicle V. The insertion hole 61 is open in the side surface 51a at one end side in the height direction Z. That is, the insertion hole 61 has a bolt insertion opening 62 into which the bolt B is inserted on the side surface 51a. Note that the insertion hole 61 of the present embodiment is also open on both sides in the depth direction Y.

Inside the insertion hole 61, an engaging part 63 (engagement) that engages, in the axial direction, the bolt B inserted into the bolt fixing portion 51 through the bolt insertion opening 62 is provided. The engaging part 63 extends from each of a pair of inner wall surfaces 64 that oppose each other in the width direction X in the insertion hole 61, for example. A plurality of engaging parts 63 are arranged in parallel in the height direction Z, for example. The engaging parts 63 incline to the frontward side in the insertion direction of the bolt B proceeding inward from the pair of inner wall surfaces 64, for example. The engaging parts 63 are engaged in the axial direction with the thread of the bolt B at distal end portions thereof.

Configuration of Biasing Part 65

The bolt fixing portion 51 includes a biasing part 65 on the side surface 51a. The biasing part 65 is located on each side of the bolt insertion opening 62 in the depth direction Y, for example. Each biasing part 65 has a pair of elastic pieces 66 that extends from the side surface 51a. The pair of elastic pieces 66 incline so as to approach each other proceeding away from the side surface 51a. Distal ends 66a of the pair of elastic pieces 66 face each other. That is, the positions of the distal ends 66a in the height direction Z coincide with each other.

As shown in FIG. 2, the pair of elastic pieces 66 have line symmetry with respect to a central axis L of the bolt insertion opening 62, as seen from the depth direction Y. Note that the central axis L of the bolt insertion opening 62 is in the height direction Z. As seen from the depth direction Y, the distances from the central axis L to root portions 66b are equal to each other. Also, as seen from the depth direction Y, the distances from the central axis L to the distal ends 66a are equal to each other.

The operation of the present embodiment will now be described.

When assembling the fixing member 50 to the bolt B, the bolt B is inserted into the insertion hole 61 of the bolt fixing portion 51 in the height direction Z. The engaging parts 63 thereby engage the outer peripheral surface of the bolt B in the axial direction. Also, the elastic pieces 66 of each biasing part 65 elastically contacts the panel P. That is, the elastic pieces 66 contact the panel P in a state where the distal ends 66a have flexed so as to approach the side surface 51a. The elastic pieces 66 thereby apply a biasing force to the panel P. It thereby becomes possible to suppress rattling of the fixing member 50.

The effect of the present embodiment will now be described.

(1) The bolt fixing portion 51 includes the side surface 51a opposing the panel P and the bolt insertion opening 62 provided in the side surface 51a and into which the bolt B is inserted. Also, the bolt fixing portion 51 includes the engaging parts 63 that engage, in the axial direction, the bolt B inserted into the bolt fixing portion 51 through the bolt insertion opening 62, and the biasing parts 65 that are provided on the side surface 51a and come into contact with the panel P. The biasing parts 65 each have the pair of elastic pieces 66 extending from the side surface 51a. The pair of elastic pieces 66 incline to approach each other proceeding away from the side surface 51a. Also, the distal ends 66a of the pair of elastic pieces 66 face each other.

According to this configuration, the distal ends 66a of the pair of elastic pieces 66 of the biasing part 65 face each other. Thus, when the fixing member 50 is being shipped or when assembling the wire harness 10 that includes the fixing member 50 to the vehicle V, for example, catching of the distal ends 66a of the elastic pieces 66 is inhibited. It thereby becomes possible to inhibit damage to the elastic pieces 66 of the biasing part 65.

(2) The wire harness 10 includes the exterior member 30 that covers the outer periphery of the wire member 20, and the path regulating member 40 that is attached to the outer periphery of the exterior member 30 and regulates the path of the exterior member 30. The path regulating member 40 has the insertion opening 40X that is open in a direction orthogonal to the length direction of the path regulating member 40 and extends over the entirety of the path regulating member 40 in the length direction. According to this configuration, it becomes possible to inhibit damage to the biasing part 65, in the wire harness 10 having the path regulating member 40.

(3) The holding portion 52 holds the path regulating member 40 in a manner covering the entire circumference of the path regulating member 40. The holding portion 52 has the protrusion 59 that protrudes on the inner peripheral side. Also, the protrusion 59 is positioned inside the insertion opening 40X. According to this configuration, rotation of the path regulating member 40 relative to the holding portion 52 can be regulated by the protrusion 59 of the holding portion 52.

The present embodiment can be modified and implemented as follows. The present embodiment and the following example modifications can be implemented in combination with each other as long as there are no technical inconsistencies.

Figure 5:
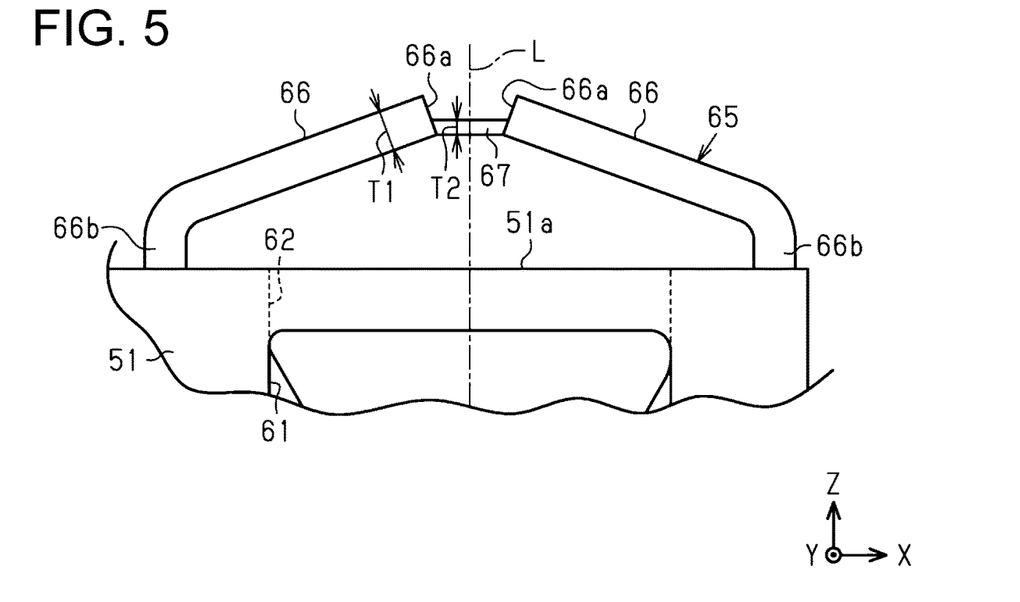
FIG. 5 is a schematic side view showing the configuration in the vicinity of the bolt fixing portion in an enlarged manner in the wire harness of an example modification.

As shown in FIG. 5, for example, the biasing part 65 may be provided with a connecting part 67 (connection) that connects the distal ends 66a of the pair of elastic pieces 66. In the configuration shown in FIG. 5, a thickness T2 of the connecting part 67 is set thinner than a thickness T1 of the elastic pieces 66. The thickness T1 of the elastic pieces 66 is the thickness of the inclined regions of the elastic pieces 66. Also, the thickness T1 of the elastic pieces 66 is uniform in the inclined regions, for example. In the pair of elastic pieces 66, the thicknesses T1 are equal to each other, for example. The connecting part 67 has a flat plate shape whose thickness T2 is uniform, for example.

According to such a configuration, it becomes possible to improve the rigidity of the elastic pieces 66, due the distal ends 66a of the pair of elastic pieces 66 being connected to each other by the connecting part 67. Also, due to the distal ends 66a of the pair of elastic pieces 66 being connected to each other by the connecting part 67, it becomes possible to inhibit catching of the distal ends 66a of the elastic pieces 66. Accordingly, it becomes possible to further inhibit damage to the elastic pieces 66. Also, by making the thickness T2 of the connecting part 67 thinner than the thickness T1 of the elastic pieces 66, it becomes possible to constitute the connecting part 67 while at the same time ensuring the ease of flexing of the elastic pieces 66. Note that, when the elastic pieces 66 come into contact with the panel P and flex, the connecting part 67 deforms. At this time, even supposing that the connecting part 67 is severed, a biasing force on the panel P is appropriately generated by the elastic pieces 66, and thus there is no problem even if the connecting part 67 is severed. Note that, in the example shown in FIG. 5, the thickness T2 of the connecting part 67 is set thinner than the thickness T1 of the elastic pieces 66, but is not limited thereto, and the thicknesses T1 and T2 may be set equal or the thickness T2 may be set thicker than the thickness T1.

Figure 6:
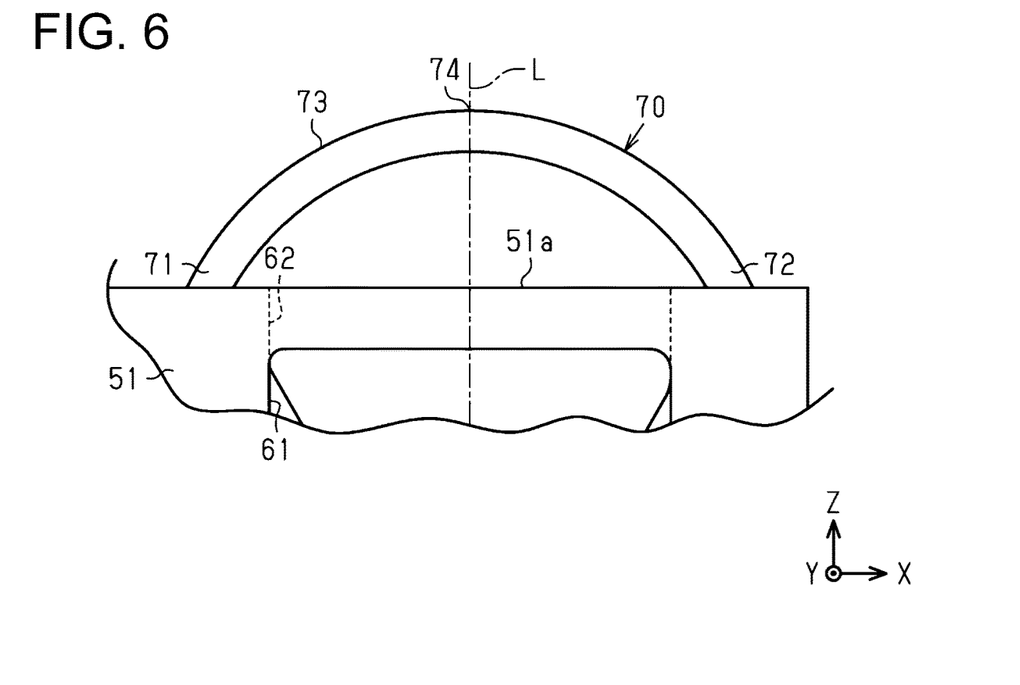
FIG. 6 is a schematic side view showing the configuration in the vicinity of the bolt fixing portion in an enlarged manner in the wire harness of an example modification.

The biasing part 65 of the above embodiment may be modified to a biasing part 70 such as shown in FIG. 6, for example. The biasing part 70 includes a first connection end 71, a second connection end 72 and an elastic portion 73. The first connection end 71 is joined to the side surface 51a of the bolt fixing portion 51. The second connection end 72 is joined to the side surface 51a of the bolt fixing portion 51. The elastic portion 73 connects the first connection end 71 and the second connection end 72. The elastic portion 73 has a circular arc shape that is convex on the side on which the biasing part 70 protrudes from the side surface 51a, for example. As seen from the depth direction Y, the biasing part 70 has line symmetry with respect to the central axis L of the bolt insertion opening 62. That is, as seen from the depth direction Y, the distance from the central axis L to the first connection end 71 and the distance from the central axis L to the second connection end 72 are equal to each other. Also, as seen from the depth direction Y, an apex portion 74 of the elastic portion 73 overlaps with the central axis L. The apex portion 74 is a central portion of the elastic portion 73 in the width direction X, and is the region of the elastic portion 73 that is positioned furthest from the side surface 51a. The elastic portion 73 comes into contact with the panel P at a region including the apex portion 74 and applies a biasing force to the panel P.

According to such a configuration, the biasing part 70 is constituted to not have a free end, that is, an end portion not joined to the side surface 51a. Thus, when the fixing member 50 is being shipped or when assembling the wire harness 10 that includes the fixing member 50 to the vehicle V, for example, catching of the biasing part 70 is inhibited. It thereby becomes possible to inhibit damage to the biasing part 70. Also, due to the elastic portion 73 having a circular arc shape that is convex on the side on which the biasing part 70 protrudes from the side surface 51a, it becomes possible to suitably apply a force to the panel P with the elastic portion 73.

- The biasing part 65 of the above embodiment is provided on each side of the bolt insertion opening 62 in the depth direction Y, but is not limited thereto, and the biasing part 65 may be provided on each side of the bolt insertion opening 62 in the width direction X. Also, the number of biasing parts 65 is not limited to two, and only one biasing part 65 or three or more biasing parts 65 may be provided. Also, in the above embodiment, the pairs of elastic pieces 66 of the biasing parts 65 are arranged in parallel in the width direction X, but are not limited thereto, and the pairs of elastic pieces 66 may be arranged in parallel in the depth direction Y.
- The fixing member 50 of the above embodiment is constituted such that the insertion opening 55 of the holding portion body 53 is set to face the panel P side and the lid part 54 covering the insertion opening 55 opposes the panel P, but is not particularly limited thereto. For example, the insertion opening 55 may be constituted to face the opposite side to the bolt fixing portion 51 in the width direction X.
- The structure of the path regulating member 40 of the above embodiment can be modified as appropriate. For example, as long as the path regulating member 40 has the insertion opening 40X and has a structure capable of being attached to the outer periphery of the exterior member 30, the remaining structure thereof is not particularly limited.
- The protruding portion 45 of the above embodiment may be provided at a position further from the insertion opening 40X than the distal end of the first end portion 41 in the circumferential direction of the path regulating member 40.
- The protruding portion 46 of the above embodiment may be provided at a position further from the insertion opening 40X than the distal end of the second end portion 42 in the circumferential direction of the path regulating member 40.
- The protruding portions 45 and 46 of the above embodiment may be provided along part of the path regulating member 40 in the length direction.
- At least one of the protruding portions 45 and 46 of the above embodiment may be omitted.
- The path regulating member 40 of the above embodiment may be constituted such that the thickness of the connecting portion 43 in the radial direction changes in the circumferential direction.
- The shape of the connecting portion 43 in the path regulating member 40 of the above embodiment is not limited to a circular arc shape, and can be modified to an elliptical arc shape or a U-shape, for example.

In the above embodiment, the path regulating member 40 is given as being more rigid than the exterior member 30, but is not limited thereto, and may have a stiffness that is equal to or less than the exterior member 30. That is, the path regulating member 40 need only act such that the wire harness body 11 is less bendable than when the path regulating member 40 is not attached thereto.

The holding portion 52 may be provided with the protrusion 59 on the holding portion body 53 rather than the lid part 54.

The fixing member 50 may hold a portion of the wire harness body 11 that does not have the path regulating member 40. Also, the path regulating member 40 may be omitted in the wire harness 10 of the above embodiment.

The exterior member 30 of the above embodiment may be provided with a metal layer containing a metal material on the outer surface of the resin corrugated tube, for example.

The exterior member 30 of the above embodiment is not limited to a corrugated tube, and may be an exterior member that does not have a large diameter portion 31 and a small diameter portion 32, for example.

The exterior member 30 of the above embodiment may have a slit that extends in the length direction of the exterior member 30.

In the above embodiment, the wires 21 are given as high voltage wires, but are not limited thereto, and the wires 21 may be low voltage wires, for example.

In the wire member 20 of the above embodiment, the electromagnetic shielding member is embodied as the braided member 25, but is not limited thereto. For example, the electromagnetic shielding member of the wire member 20 may be embodied as a metal foil.

The braided member 25 of the wire member 20 of the above embodiment may be omitted.

In the above embodiment, the number of wires 21 constituting the wire member 20 is given as two, but is not limited thereto. The number of wires 21 may be one or may be three or more.

The disposition relationship between the inverter M1 and the high voltage battery M2 in the vehicle V is not limited to the above embodiment, and may be modified as appropriate according to the vehicle configuration.

In the above embodiment, the plurality of in-vehicle devices to which the wire harness 10 is electrically connected are embodied as the inverter M1 and the high voltage battery M2, but are not limited thereto. The plurality of in-vehicle devices to which the wire harness 10 is electrically connected are not particularly limited as long as they are electrical devices that are installed in the vehicle V.

The embodiment and example modifications disclosed herein are illustrative in all respects, and the present disclosure is not limited to these illustrative examples. That is, the scope of the disclosure is defined by the claims, and all changes that come within the meaning and range of equivalency of the claims are intended to be embraced therein.

What is claimed is:

1. A wire harness comprising:
an electrical wire; and
a fixing member that fixes the electrical wire to an attachment target, wherein:
the fixing member has:
a bolt fixing portion to be fixed to a bolt of the attachment target; and
a holder that holds the electrical wire,
the bolt fixing portion includes:
a side surface that opposes the attachment target;
a bolt insertion opening provided in the side surface and into which the bolt is to be inserted;
an engagement that engages, in an axial direction of the bolt fixing portion, the bolt inserted into the bolt fixing portion through the bolt insertion opening; and
a biasing part that is provided on the side surface and comes into contact with the attachment target, wherein:
the biasing part includes a pair of elastic pieces extending from the side surface, the pair of elastic pieces having a uniform thickness,
the pair of elastic pieces incline so as to approach each other proceeding away from the side surface, with distal ends of the pair of elastic pieces facing each other,
the biasing part includes a connection connecting the distal ends of the pair of elastic pieces to each other,
the connection is positioned to connect a shortest distance between the pair of elastic pieces.

2. The wire harness according to claim 1, wherein the connection is thinner in thickness than the elastic pieces.

3. The wire harness according to claim 1, comprising:
an exterior tube covering an outer periphery of the electrical wire; and
a path regulator attached to an outer periphery of the exterior tube and regulating a path of the exterior tube,
wherein the path regulator has an insertion opening open in a direction orthogonal to a length direction of the path regulator and extending over an entirety of the path regulator in the length direction.

4. The wire harness according to claim 3, wherein:
the holder holds the path regulator in a manner covering an entire circumference of the path regulator,
the holder has a protrusion protruding on an inner peripheral side, and
the protrusion is positioned inside the insertion opening of the path regulator.

5. A wire harness comprising:
an electrical wire; and
a fixing member that fixes the electrical wire to an attachment target, wherein:
the fixing member has:
a bolt fixing portion to be fixed to a bolt of the attachment target; and
a holder that holds the electrical wire,
the bolt fixing portion includes:
a side surface that opposes the attachment target;
a bolt insertion opening provided in the side surface and into which the bolt is to be inserted;
an engagement that engages, in an axial direction of the bolt fixing portion, the bolt inserted into the bolt fixing portion through the bolt insertion opening; and
a biasing part that is provided on the side surface and comes into contact with the attachment target, and
the biasing part has:
a first connection end joined to the side surface;
a second connection end joined to the side surface; and
an elastic portion that connects the first connection end and the second connection end, and that comes into contact with the attachment target and applies a force to the attachment target, the elastic portion having a circular arc shape that is convex on a side that the biasing part protrudes from on the side surface, the circular arc shape extending from the first connection end to the second connection end.

\* \* \* \* \*